(12) United States Patent  
Mourou et al.

(10) Patent No.: US 7,621,574 B2
(45) Date of Patent: Nov. 24, 2009

(54) VEHICLE DITCH MOLDING

(75) Inventors: Julien P. Mourou, Warren, MI (US); Amit A. Wavde, Sterling Heights, MI (US); Anton J. Bering, Clinton Township, MI (US); Jimmie C. Wilkins, Troy, MI (US); Keith D. Alvord, Portage, MI (US); Jason L. Bowman, Livinia, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 266 days.

(21) Appl. No.: 11/844,398

(22) Filed: Aug. 24, 2007

(65) Prior Publication Data

US 2009/0051183 A1 Feb. 26, 2009

(51) Int. Cl.
*B60R 13/06* (2006.01)
(52) U.S. Cl. ............... 296/1.08; 24/292; 49/489.1; 52/716.5; 428/31
(58) Field of Classification Search ............... 24/289, 24/292, 297; 49/489.1, 495.1, 496.1, 498.1; 52/466, 468, 716.1, 716.5, 716.6, 716.7, 52/717.05, 718.01, 718.03, 718.04, 718.06; 293/126; 296/1.08, 93, 210, 213; 428/31, 428/36.9, 99, 217
See application file for complete search history.

(56) References Cited

U.S. PATENT DOCUMENTS

| 4,122,583 | A | * | 10/1978 | Grittner et al. ............... 24/703.1 |
| 4,246,303 | A | * | 1/1981 | Townsend ..................... 428/31 |
| 4,920,618 | A | * | 5/1990 | Iguchi ......................... 24/453 |
| 5,013,083 | A | * | 5/1991 | Yada et al. ................... 296/213 |
| 5,065,960 | A | * | 11/1991 | Castellucci ................... 244/131 |
| 5,074,089 | A | * | 12/1991 | Kemmer et al. ............... 52/395 |
| 5,688,016 | A | * | 11/1997 | Gold ........................... 296/93 |
| 6,210,615 | B1 | * | 4/2001 | Yoshizuru et al. ............ 264/138 |
| 6,224,145 | B1 | * | 5/2001 | Sugiura ....................... 296/210 |
| 6,695,397 | B2 | * | 2/2004 | Kamiya et al. ............... 296/210 |
| 6,709,048 | B2 | * | 3/2004 | Nagashima et al. ........... 296/210 |
| 6,877,798 | B2 | * | 4/2005 | Nakajima et al. ............. 296/210 |
| 6,974,181 | B2 | * | 12/2005 | Mikkaichi et al. ............ 296/210 |
| 7,045,189 | B2 | * | 5/2006 | Hui et al. ..................... 428/99 |
| 7,143,485 | B2 | * | 12/2006 | Kanie .......................... 24/453 |
| 2002/0180246 | A1 | * | 12/2002 | Nagashima et al. ........... 296/210 |

(Continued)

FOREIGN PATENT DOCUMENTS

GB 2102868 A * 2/1983

(Continued)

*Primary Examiner*—Glenn Dayoan
*Assistant Examiner*—Paul A Chenevert

(57) ABSTRACT

A vehicle ditch molding for insertion and retention in a recess, such as a roof ditch, formed between a first vehicle body panel and a second vehicle body panel is disclosed. The vehicle ditch molding may include a head extending outward from a ditch molding centerline and configured to cover an opening to the recess, and a stem extending from the head along the ditch molding centerline and configured to be narrower than the opening to the recess. Also, the vehicle ditch molding may include a pair of wings extending outward from the stem, with each of the wings having an upper surface facing the head and a lower surface, with each having a wing lower notch extending into the wing lower surface defining an inner living hinge extending between the respective wing lower notch and the corresponding upper surface.

20 Claims, 4 Drawing Sheets

U.S. PATENT DOCUMENTS

| | | | |
|---|---|---|---|
| 2003/0111869 A1 * | 6/2003 | Kamiya et al. ............... | 296/210 |
| 2004/0012229 A1 * | 1/2004 | Nakajima et al. ...... | 296/203.03 |
| 2005/0104406 A1 * | 5/2005 | Pennerath .................... | 296/93 |
| 2005/0189793 A1 * | 9/2005 | Wato et al. .................. | 296/210 |
| 2006/0001290 A1 * | 1/2006 | Hammaker et al. .... | 296/146.15 |
| 2006/0082189 A1 * | 4/2006 | Sultan et al. ............. | 296/146.9 |
| 2006/0174579 A1 * | 8/2006 | Matson ........................ | 52/696 |
| 2008/0263991 A1 * | 10/2008 | Gambatese ................ | 52/716.6 |
| 2008/0277973 A1 * | 11/2008 | Mourou ...................... | 296/210 |

FOREIGN PATENT DOCUMENTS

| | | | | |
|---|---|---|---|---|
| JP | 62012441 A | * | 1/1987 | |
| JP | 62178421 A | * | 8/1987 | |
| JP | 05008697 A | * | 1/1993 | |
| JP | 06219163 A | * | 8/1994 | |

\* cited by examiner

VEHICLE DITCH MOLDING

BACKGROUND OF INVENTION

The present invention relates generally to vehicle ditch moldings secured in ditches in outer vehicle panels, such as roof ditch moldings.

Moldings that are used in recesses between outer body panels on the vehicle are well known. Typically they are used for minimizing water or foreign object intrusion into the recess as well as to improve the aesthetic appearance where the body panels are joined. One example is a roof ditch molding that is used in a roof ditch formed by the connection of a roof panel and a side body panel. It is desirable for these types of moldings to be relatively inexpensive, easy to assemble to the vehicle, and yet difficult to pull off of the vehicle.

Some prior art moldings employ multiple pieces to assure that the retention capability is high. However, these moldings proved to be less cost-effective and more difficult to assemble than is desired. Some prior art single piece moldings, while relatively inexpensive and easy to assemble, proved to be too easy to pull off the vehicle, thus potentially detracting from the aesthetic appearance of the vehicle. Reshaping such single piece moldings has allowed for an increase in the retention force, but at the expense of now requiring tools, such as overhead rollers or robots, to assemble them to vehicles because the insertion force is high. This extra tooling increases the investment needed for vehicle assembly and also reduces the build flexibility—where on an assembly line the molding will be installed. Consequently, for conventional single piece roof ditch moldings there is a trade-off between the insertion force needed for assembly and the extraction force that will pull the molding loose from the vehicle.

Accordingly, a desire has arisen for an improved molding that will allow for an insertion force that is low enough to allow for hand assembly without tools, while still having a relatively high extraction force to assure that the molding stays on the vehicle once assembled to it. Moreover, it is desirable that such a molding maintains an acceptably high extraction force when tolerances between a roof body panel and a side body panel on a particular vehicle increase the width of the roof ditch, while also maintaining an acceptably low insertion force on vehicles where the tolerances for assembly of the body panels causes the roof ditch to be narrower than nominal.

SUMMARY OF INVENTION

An embodiment contemplates a vehicle ditch molding for insertion and retention in a recess formed between a first vehicle body panel and a second vehicle body panel, the vehicle ditch molding comprising a head, a stem and a pair of wings. The head extends outward from a ditch molding centerline and is configured to cover an opening to the recess. The stem extends from the head along the ditch molding centerline and is configured to be narrower than the opening to the recess. The pair of wings extend outward from the stem in opposed directions relative to the ditch molding centerline, with each of the wings having an upper surface facing the head and an opposed lower surface, and with each of the wings having a wing lower notch extending into the wing lower surface defining an inner living hinge extending between the respective wing lower notch and the corresponding upper surface.

An embodiment contemplates a vehicle comprising a first vehicle body panel, a second vehicle body panel, and a roof ditch molding. The first vehicle body panel defines a portion of a roof ditch and having a first side wall. The second vehicle body panel defines another portion of the roof ditch and has a second side wall in opposed relation to and spaced from the first side wall; the first and second side walls being convergent extending from a bottom of the roof ditch toward a roof ditch opening. The roof ditch molding including a head extending outward from a ditch molding centerline and covering the roof ditch opening; a stem extending from the head along the ditch molding centerline, being narrower than the roof ditch opening, and extending into the roof ditch; and a pair of wings extending outward from the stem in opposed directions relative to the ditch molding centerline, each of the wings having an upper surface facing the head and an opposed lower surface, and each of the wings having a wing lower notch extending into the wing lower surface defining an inner living hinge extending between the respective wing lower notch and the corresponding upper surface, with one of the lower surfaces being in frictional engagement with the first side wall and the other of the lower surfaces being in frictional engagement with the second side wall.

An advantage of an embodiment is that the ditch molding reduces insertion forces to a level allowing for hand insertion (without requiring a tool, such as an overhead roller or robot) while increasing extraction forces to minimize the possibility that the ditch molding will be inadvertently extracted (pulled out) from the ditch.

An advantage of an embodiment is a reduced insertion force (reduced ergonomic efforts required by installers), which generally allows for insertion without a tool, and allows for increased flexibility as to where and when on a vehicle assembly line it is inserted-all while maintaining adequate extraction forces. Thus, the cost of molding installation can be minimized.

DETAILED DESCRIPTION

Figure 1:
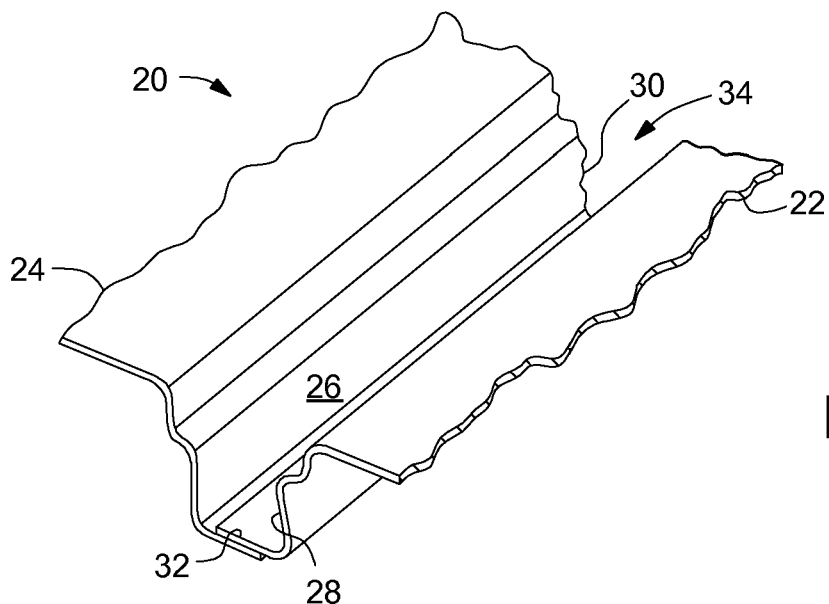
FIG. 1 is a schematic perspective view of a recess, such as a roof ditch on a vehicle.
Figure 2:
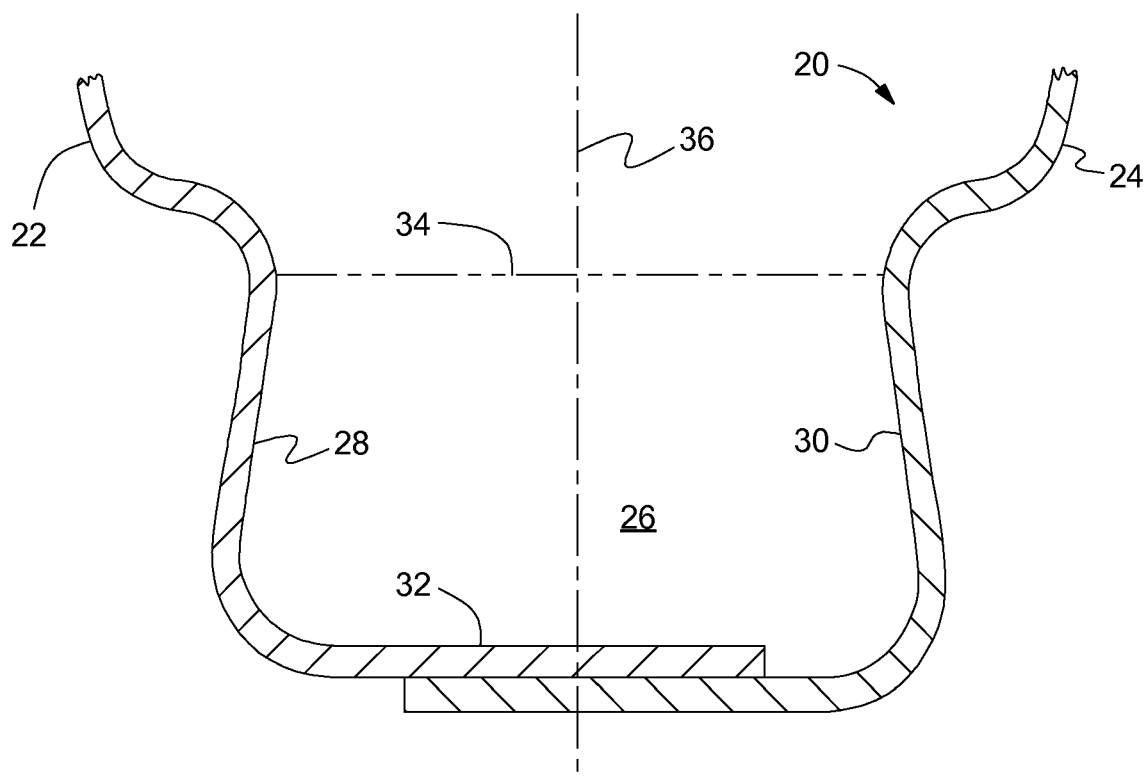
FIG. 2 is a cross section of the recess prior to insertion of a vehicle ditch molding.

Referring to FIGS. 1 and 2, a portion of a vehicle, indicated generally at 20, is shown. The vehicle portion 20 includes a first vehicle body panel 22 mounted to a second vehicle body panel 24. The first and second body panels 22, 24 may be, for example, a roof panel and a side body panel. The first and second body panels 22, 24 are shaped and joined together to form a recess 26, which may be, for example, a roof ditch. They may be joined in a conventional manner, such as by welding.

The recess 26 is defined by a first side wall 28 formed by the first body panel 22 and a second side wall 30 formed by the second body panel 24. A bottom 32 of the recess 26 is formed by the overlapping of the first and second body panels 22, 24. The first and second side walls 28, 30 converge toward one another as they extend from the bottom 32 up toward an opening 34 (shown as a phantom line) defining an upper extent of the recess 26. A ditch centerline 36 is defined about midway between the first and second side walls 28, 30.

Figure 3:
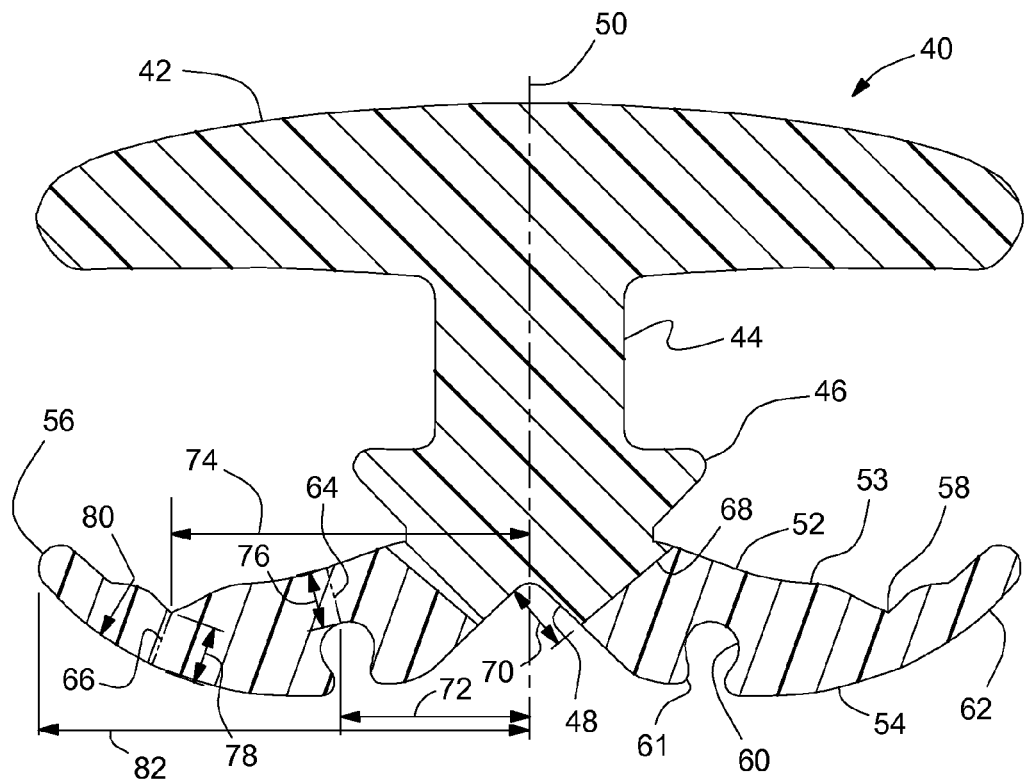
FIG. 3 is a cross section of the vehicle ditch molding in an as-formed, pre-installed (unflexed) state.

Referring now to FIG. 3, a vehicle ditch molding, indicated generally at 40, is shown in an as-formed pre-installed (un-flexed) state. The molding 40 includes a head 42 connected to a stem 44, which has stem protrusions 46 extending therefrom on a lower portion of the stem 44. A lower end of the stem 44, opposite the head 42, includes a stem central notch 48. The head 42, stem 44, and notch 48 are generally symmetrical about a ditch molding center line 50. The terms upper, lower, top, bottom and similar terms are relative terms that relate to the orientation of the elements shown in the drawing. The actual recess 26 (FIG. 2) and ditch molding 40, of course, will be oriented based on the location on an actual vehicle.

A pair of wings 52 extend outward from the stem 44 in generally opposed directions. The pair of wings 52 are also generally symmetrical about the ditch molding center line 50. Each of the wings 52 includes an upper surface 53 and a lower surface 54. Each upper surface 53 initially angles downward as it extends outward away from the stem 44 towards a tip 56. Each upper surface 53 also includes a wing upper notch 58. Each lower surface 54 extends outward from the stem central notch 48 to a wing lower notch 60, which may be substantially larger than the upper notch 58. The lower notch 60 may have an opening 61 that is narrower than a main portion of the lower notch 60. Each lower surface 54 extends outward from its respective wing lower notch 60 along an upwardly curving outer wing surface 62. Each wing lower notch 60 defines in its respective wing 52 an inner living hinge 64 (shown as a phantom line) between the wing lower notch 60 and the upper surface 53. Each wing upper notch 58 defines in its respective wing 52 and outer living hinge 66 (shown as a phantom line) between the wing upper notch 58 and the outer wing surface 62. Thus, each wing 52 has a pair of flex points defined by the living hinges 64, 66. The terms inner and outer, as used herein, are relative to the ditch molding centerline 50, with elements listed as inner being closer to the centerline 50 relative to elements referred to as outer or outward, which are farther from the centerline 50.

The vehicle ditch molding 40 is preferably a co-extruded section made from plastic materials having significantly different stiffnesses. The plastic may be, for example, polyvinyl chloride (PVC), thermoplastic elastomer (TPE), thermoplastic plastic vulcanized (TPV), or thermoplastic polyolefin (TPO). The higher stiffness material forms the head 42, stem 44, stem central notch 48, and a small inner portion of each wing 52, up to a knit line 68. The lower stiffness material (that is, highly elastic material) forms most of the wings 52, including, of course, the inner and outer living hinges 64, 66.

In addition to the living hinges 64, 66 and material properties, various relative dimensions between wing features (and relative to the recess 26, FIG. 2) also help minimize the molding insertion force while maximizing the molding retention force. These dimensions are for the unflexed, as-molded shape of the ditch molding 40. A knit line dimension 70 is the distance from a parallel surface of the stem central notch 48 to the knit line 68. An inner hinge distance 72 is a distance from the ditch molding centerline 50 to the inner living hinge 64, and an outer hinge distance 74 is a distance from the ditch molding centerline 50 to the outer living hinge 66. An inner living hinge width 76 is a thickness of material between the lower notch 60 and the upper surface 53, and an outer living hinge width 78 is a thickness of material between the upper notch 58 and the lower surface 54. A wing engagement surface radius 80 is a radius of curvature of the outer wing surface 62, and a wing length 82 is a distance from the molding centerline 50 to the tip 56.

A non-limiting example of dimensions that produce a ditch molding 40 having the relatively low insertion force while also having a relatively high extraction force is the following. For a ditch molding 40 being inserted into a ditch opening 34 with a nominal width of 12.64 millimeters (mm) (and tolerances of +/−1.5 mm), the wing length 82 may be 10.03 mm (+/−1.0 mm), and the knit line dimension 70 may be 1.76 mm (+/−0.38 mm). The inner hinge distance 72 may be 3.35 mm (+/−0.5 mm), the outer hinge distance 74 may be 6.32 mm (+/−0.2 mm). Also, the inner living hinge width 76 may be 1.25 mm (+/−0.25 mm), the outer living hinge width 78 may be 1.25 mm (+/−0.25 mm), and the wing engagement surface radius 80 may be 5.57 mm (+/−0.5 mm).

Figure 4:
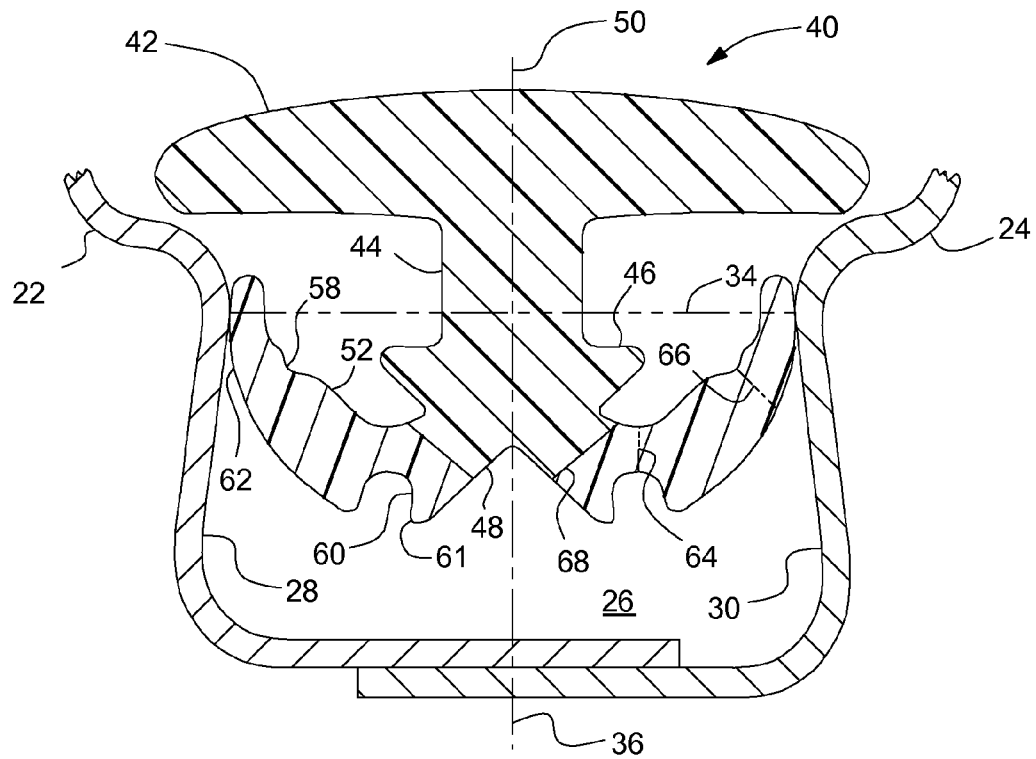
FIG. 4 is a cross section of a vehicle ditch molding mounted in a recess in a fully engaged position in the recess.

FIG. 4 illustrates the vehicle ditch molding 40 after being inserted into a fully engaged position in the recess 26. The ditch centerline 36 may align with the ditch molding centerline 50. The head 42 covers the opening 34 to the recess 26, with the outer wing surface 62 of one wing 52 in frictional contact with the first side wall 28 of the first body panel 22 and the outer wing surface 62 of the other wing 52 in frictional contact with the second side wall 30 of the second body panel 24. The head 42, stem 44, stem protrusion 46, and stem central notch 48, being made of a relatively stiff material, generally retain their shape.

The wings 52, being made of a relatively flexible material beyond the knit line 68, are flexed upward, which occurs during the insertion of the molding 40 into the recess 26. A significant amount of the flexing occurs at the inner and outer living hinges 64, 66. The outer living hinge 66 causes the wing upper notch 58 to close somewhat, while the inner living hinge 64 causes the wing lower notch 60 to open, with the opening 61 now being as wide or wider than the main portion of the lower notch 60. This flexing of the elastic material causes the outer wing surfaces 62 to press against the opposed first and second side walls 28, 30, which retains the ditch molding 40 in the recess 26.

Figure 5:
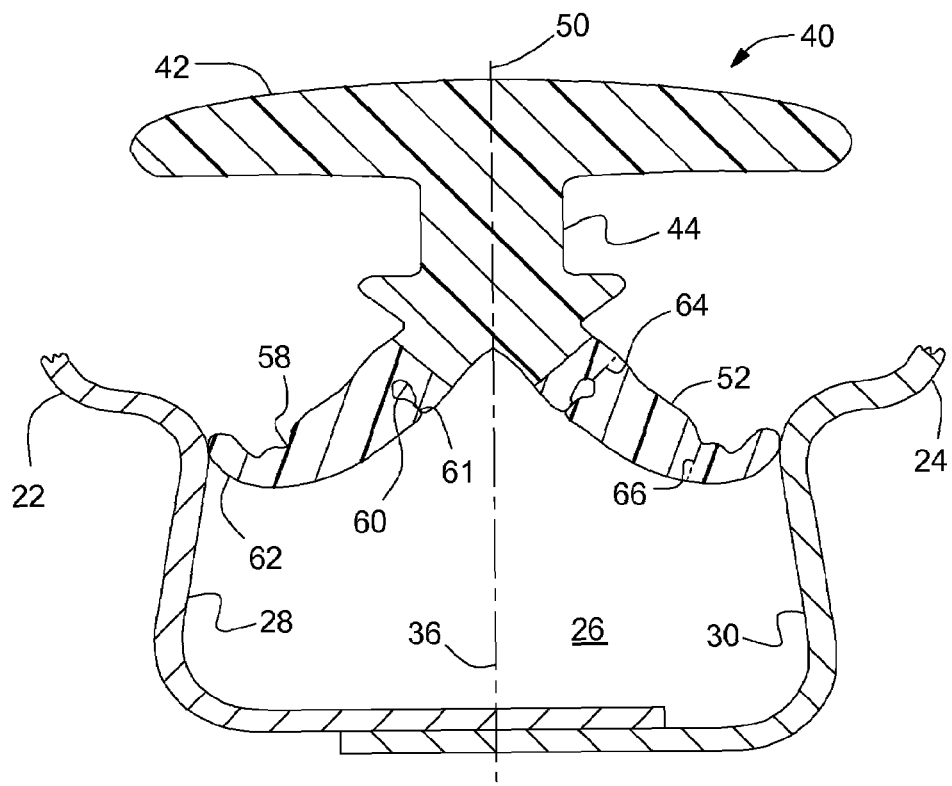
FIG. 5 is a cross section of a vehicle ditch molding mounted in a recess in a partially removed position in the recess, after having been in the fully engaged position.

FIG. 5 illustrates the vehicle ditch molding 40 mounted in the recess 26 in a partially removed position, after having been in the fully engaged position. Should something or someone accidentally pull up on the head 42 of the vehicle ditch molding 40, it is desirable to have a relatively high retention force in order to retain the ditch molding 40 in the recess 26.

One will note from FIG. 5 that, upon pulling up on the head 42, the stem 44 will transmit the upward force to the wings 52. As the molding 40 begins to pull out of the recess 26, the shape and locations of the features of the wings 52 will cause the wings 52, overall, to straighten out. That is, the wings 52 will change from a more rounded, curved shape to extending more linearly—with the exception of the wing outer surfaces 62, which will be flexed into a smaller radius of curvature, keeping an outward force on the side walls 28, 30 of the body panels 22, 24. Also, the opening 61 of the wing lower notch 60 will close, minimizing the ability of the inner living hinges 64 to flex any further. This provides a bias against the wings 52 flexing any closer to one another. Consequently, the force required to extract the molding 40 from the recess 26 is relatively high.

Figure 6:
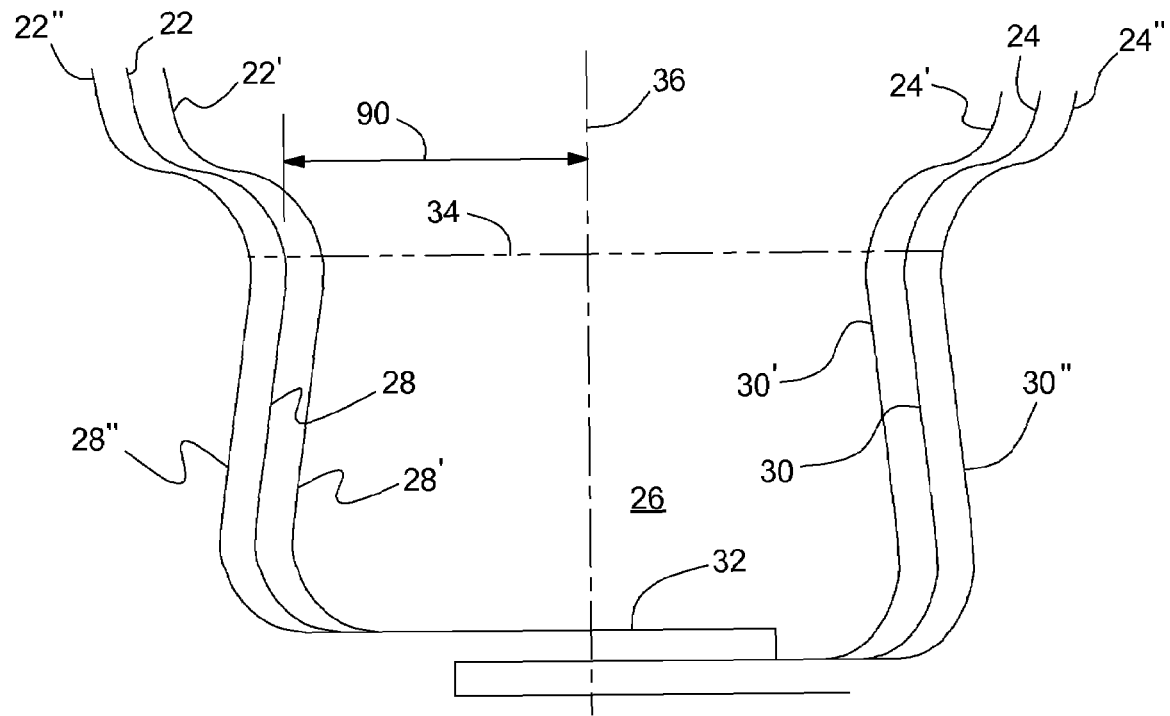
FIG. 6 is a schematic view of the recess of FIG. 4, but illustrating the possible width variations in the recess due to vehicle manufacturing tolerances.

FIG. 6 is a schematic of the recess 26 illustrating possible width variations in the recess 26 due to vehicle manufacturing tolerances. The first side wall 28 of the first body panel 22 is shown, having a nominal ditch half-width dimension 90 from the ditch centerline 36 to the first side wall 28 at the recess opening 34. The second side wall 30 of the second body panel is the same distance from the ditch centerline 36. The first side wall 28' of the first body panel 22' and the second side wall 30' of the second body panel 24' illustrate the reduced width of the recess 26 when tolerances stack up to move the side walls 28', 30' closer together. The first side wall 28" of the first body panel 22" and the second side wall 30" of the second body panel 24" illustrate the expanded width of the recess 26 when tolerances stack up to move the side walls 28", 30" farther apart. One will note, then, that there can be a significant width variation in the recess 26 due to the tolerances from fabricating and assembling vehicle body panels.

Figure 7:
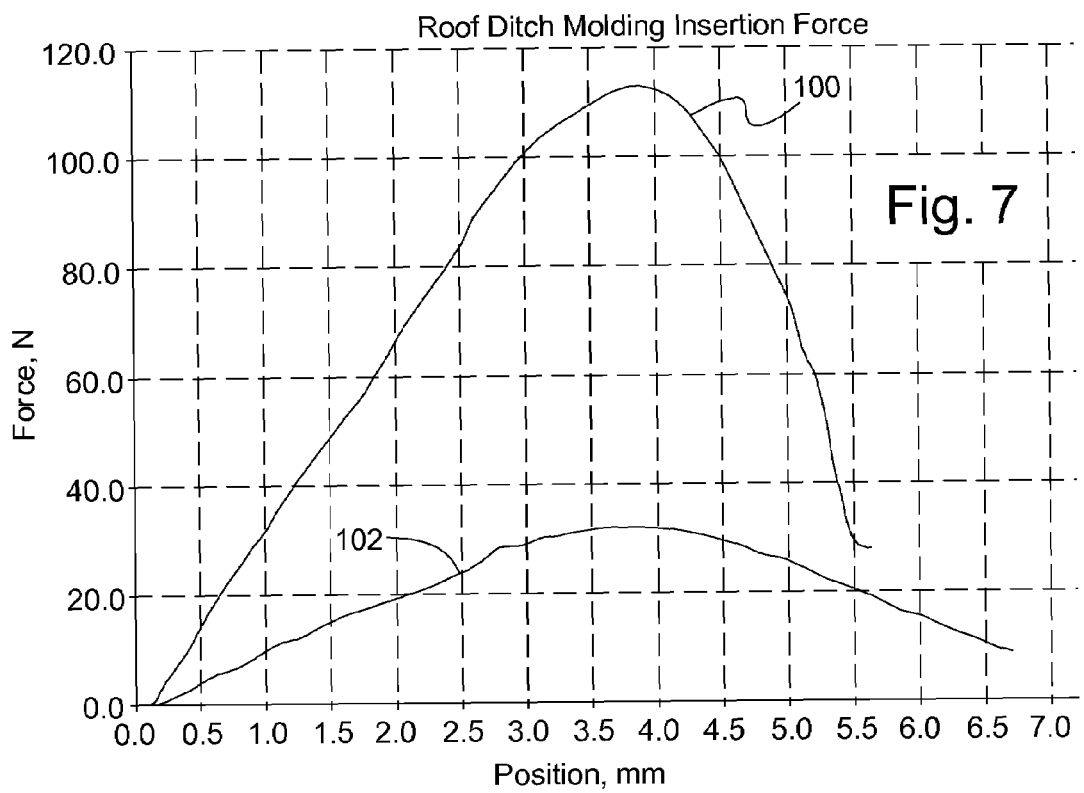
FIG. 7 is a graph illustrating differences in insertion forces between a typical conventional roof ditch molding and a roof ditch molding of the present invention when the roof ditch is a minimum width due to tolerances.
Figure 8:
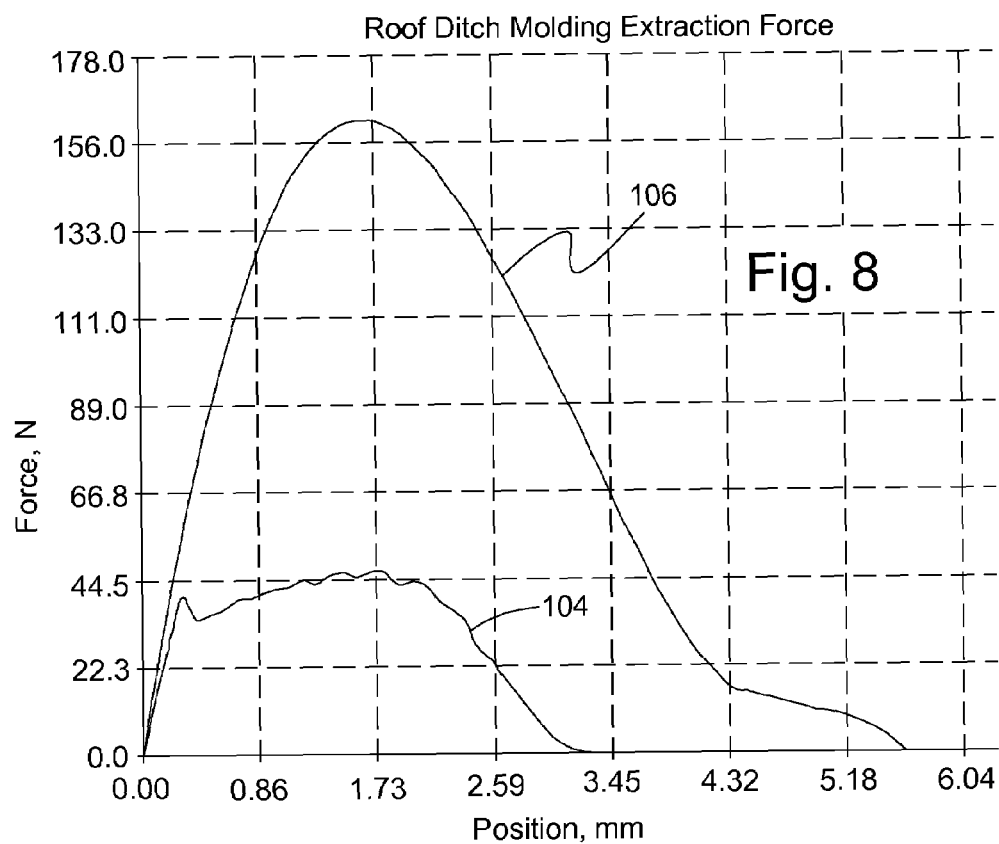
FIG. 8 is a graph illustrating differences in extraction forces between a typical conventional roof ditch molding and a roof ditch molding of the present invention when the roof ditch is a maximum width due to tolerances.

The significance of the width variations due to tolerances is important in that, a narrower width recess 26 will generally increase the insertion force required, while a greater width recess 26 will generally reduce the extraction force. FIGS. 7 and 8 show that the vehicle ditch molding 40 (FIG. 3) provides desirably low insertion forces for a narrower recess 26 (side walls 28' and 30') while maintaining relatively high extraction forces for a wider recess 26 (side walls 28" and 30"). The graphs are applicable for the sample dimensions given above.

FIG. 7 is a graph illustrating differences in insertion forces between a typical conventional roof ditch molding and a comparable roof ditch molding of the present invention when the roof ditch is a minimum width due to tolerances. The upper line 100 is an insertion force versus insertion position for a typical conventional roof ditch molding. The lower line 102 is an insertion force versus insertion position for a ditch molding as disclosed herein. One will note the significant difference in the maximum insertion force required. The significant reduction in insertion force required may allow for the assembly of a roof ditch molding without requiring the use of an overhead roller or robot on a vehicle assembly line.

FIG. 8 is a graph illustrating differences in extraction forces between a typical conventional roof ditch molding and a comparable roof ditch molding of the present invention when the roof ditch is a maximum width due to tolerances. The lower line 104 is an extraction force versus extraction position for a typical conventional roof ditch molding. The upper line 106 is an extraction force versus extraction position for a ditch molding as disclosed herein. Again, one will note a significant difference in force. This higher extraction force better assures that roof ditch molding will not be inadvertently pulled out of a roof ditch after installation.

While certain embodiments of the present invention have been described in detail, those familiar with the art to which this invention relates will recognize various alternative designs and embodiments for practicing the invention as defined by the following claims.

What is claimed is:

1. A vehicle ditch molding for insertion and retention in a recess formed between a first vehicle body panel and a second vehicle body panel, the vehicle ditch molding comprising:
    a head extending outward from a ditch molding centerline and configured to cover an opening to the recess;
    a stem extending from the head along the ditch molding centerline and configured to be narrower than the opening to the recess; and
    a pair of wings extending outward from the stem in opposed directions relative to the ditch molding centerline, each of the wings having an upper surface facing the head and an opposed lower surface, and each of the wings having a wing lower notch extending into the wing lower surface defining an inner living hinge extending between the respective wing lower notch and the corresponding upper surface.

2. The vehicle ditch molding of claim 1 wherein each of the wings includes a wing upper notch extending into the wing upper surface defining an outer living hinge extending between the respective wing upper notch and the corresponding lower surface, each of the wing upper notches being spaced farther from the ditch molding centerline than the wing lower notches.

3. The vehicle ditch molding of claim 2 wherein a thickness of the outer living hinge is equal to a thickness of the inner living hinge.

4. The vehicle ditch molding of claim 2 wherein a thickness of the outer living hinge is 0.67 to 1.5 times a thickness of the inner living hinge.

5. The vehicle ditch molding of claim 2 wherein each of the outer living hinges are a distance from the ditch molding centerline that is 1.9 times a distance that each of the inner living hinges are from the ditch molding centerline.

6. The vehicle ditch molding of claim 2 wherein each of the outer living hinges are a distance from the ditch molding centerline that is from 1.6 to 2.3 times a distance that each of the inner living hinges are from the ditch molding centerline.

7. The vehicle ditch molding of claim 1 wherein the head, the stem and a first portion of each of the wings adjacent to the stem are made of a first material having a first stiffness, and a second portion of each of the wings, extending from the respective first portions, are made from a second material having a second stiffness that is less than the first stiffness.

8. The vehicle ditch molding of claim 7 wherein the first material and the second material are a polyvinyl chloride material.

9. The vehicle ditch molding of claim 7 wherein the first material and the second material are a thermoplastic plastic vulcanized material.

10. The vehicle ditch molding of claim 1 wherein the lower surface of each of the wings includes an outer wing surface, spaced farther from the ditch molding centerline than the respective wing lower notch, with each outer wing surface curving toward the head as the outer wing surface extends away from the respective wing lower notch.

11. The vehicle ditch molding of claim 1 wherein the stem includes a stem notch located between the pair of wings.

12. The vehicle ditch molding of claim 1 wherein the recess is a roof ditch and the stem is configured to be narrower than the opening to the roof ditch and extend into the roof ditch.

13. The vehicle ditch molding of claim 1 wherein the wing lower notch defines a notch opening at the lower surface and a main notch portion, and the notch opening has a width that is less than a width of the main notch portion when the vehicle ditch molding is in an unflexed position.

14. A vehicle comprising:
    a first vehicle body panel defining a portion of a roof ditch and having a first side wall;
    a second vehicle body panel defining another portion of the roof ditch and having a second side wall in opposed relation to and spaced from the first side wall; the first and second side walls being convergent extending from a bottom of the roof ditch toward a roof ditch opening; and a roof ditch molding including a head extending outward from a ditch molding centerline and covering the roof ditch opening; a stem extending from the head along the ditch molding centerline, being narrower than the roof ditch opening, and extending into the roof ditch; and a pair of wings extending outward from the stem in opposed directions relative to the ditch molding centerline, each of the wings having an upper surface facing the head and an opposed lower surface, and each of the wings having a wing lower notch extending into the wing lower surface defining an inner living hinge extending between the respective wing lower notch and the corresponding upper surface, with one of the lower surfaces being in frictional engagement with the first side wall and the other of the lower surfaces being in frictional engagement with the second side wall.

15. The vehicle of claim 14 wherein each of the wings includes a wing upper notch extending into the respective wing upper surface defining a respective outer living hinge extending between the respective wing upper notch and the corresponding lower surface, each of the wing upper notches being spaced farther from the ditch molding centerline than the wing lower notches.

16. The vehicle of claim 14 wherein each of the wing upper notches are a distance from the ditch molding centerline, when the roof ditch molding is in an unflexed position, that is equal to half a width of the roof ditch opening.

17. The vehicle of claim 14 wherein the head, the stem and a first portion of each of the wings adjacent to the stem are made of a first material having a first stiffness, and a second portion of each of the wings, extending from the respective first portions, are made from a second material having a second stiffness that is less than the first stiffness.

18. A vehicle ditch molding for insertion and retention in a recess formed between a first vehicle body panel and a second vehicle body panel, the vehicle ditch molding comprising:
a head extending outward from a ditch molding centerline and configured to cover an opening to the recess;
a stem extending from the head along the ditch molding centerline and configured to be narrower than the opening to the recess; and
a pair of wings extending outward from the stem in opposed directions relative to the ditch molding centerline, each of the wings having an upper surface facing the head and an opposed lower surface, and each of the wings having a wing lower notch extending into the wing lower surface defining an inner living hinge extending between the respective wing lower notch and the corresponding upper surface, wherein each of the wings includes a wing upper notch extending into the wing upper surface defining an outer living hinge extending between the respective wing upper notch and the corresponding lower surface, each of the wing upper notches being spaced farther from the ditch molding centerline than the wing lower notches, and wherein the head, the stem and a first portion of each of the wings adjacent to the stem are made of a first material having a first stiffness, and a second portion of each of the wings, extending from the respective first portions, are made from a second material having a second stiffness that is less than the first stiffness.

19. The vehicle ditch molding of claim 18 wherein the wing lower notch defines a notch opening at the lower surface and a main notch portion, and the notch opening has a width that is less than a width of the main notch portion when the vehicle ditch molding is in an unflexed position.

20. The vehicle ditch molding of claim 18 wherein each of the outer living hinges are a distance from the ditch molding centerline that is from 1.6 to 2.3 times a distance that each of the inner living hinges are from the ditch molding centerline.

* * * * *